United States Patent
Kato et al.

(10) Patent No.: US 9,309,420 B2
(45) Date of Patent: Apr. 12, 2016

(54) INK-JET RECORDING APPARATUS

(71) Applicants: Ryuji Kato, Kiyosu (JP); Ai Tahara, Kariya (JP)

(72) Inventors: Ryuji Kato, Kiyosu (JP); Ai Tahara, Kariya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 314 days.

(21) Appl. No.: 13/868,169

(22) Filed: Apr. 23, 2013

(65) Prior Publication Data

US 2013/0286086 A1    Oct. 31, 2013

(30) Foreign Application Priority Data

Apr. 27, 2012  (JP) ................. 2012-104137

(51) Int. Cl.
| | |
|---|---|
| *C09D 11/10* | (2014.01) |
| *C09D 11/30* | (2014.01) |
| *B41J 2/175* | (2006.01) |
| *B41J 2/17* | (2006.01) |
| *C09D 11/38* | (2014.01) |

(52) U.S. Cl.
CPC . *C09D 11/10* (2013.01); *B41J 2/17* (2013.01); *B41J 2/17503* (2013.01); *C09D 11/30* (2013.01); *C09D 11/38* (2013.01)

(58) Field of Classification Search
CPC .... B41J 2/175; B41J 2/17513; B41J 2/17566; B41J 2/2107; B41J 2/2114; B41J 2/17; C09D 11/30; C09D 11/38; C09D 11/10

USPC ......... 347/84–86, 95–100, 20–35; 106/31.13, 106/31.27, 31.57, 31.6, 31.85

See application file for complete search history.

(56) References Cited

U.S. PATENT DOCUMENTS

| | | | | |
|---|---|---|---|---|
| 4,849,773 | A | * | 7/1989 | Owatari ................. 347/100 |
| 4,973,992 | A | | 11/1990 | Owatari |
| 5,609,671 | A | | 3/1997 | Nagasawa |
| 5,837,045 | A | | 11/1998 | Johnson et al. |
| 6,893,491 | B2 | * | 5/2005 | Yamazaki et al. ......... 106/31.86 |
| 7,922,805 | B2 | | 4/2011 | Kowalski et al. |
| 8,016,404 | B2 | | 9/2011 | Kato et al. |
| 8,079,685 | B2 | | 12/2011 | Kanbe et al. |
| 2006/0201380 | A1 | | 9/2006 | Kowalski et al. |
| 2007/0100023 | A1 | | 5/2007 | Burns et al. |
| 2007/0100024 | A1 | | 5/2007 | Gu et al. |
| 2008/0241398 | A1 | | 10/2008 | Kato et al. |
| 2009/0058963 | A1 | | 3/2009 | Kanbe et al. |

FOREIGN PATENT DOCUMENTS

| | | |
|---|---|---|
| JP | S6366268 A | 3/1988 |
| JP | 08-003498 A | 1/1996 |
| JP | 2874691 B2 | 3/1999 |

(Continued)

OTHER PUBLICATIONS

Jan. 15, 2016—(JP) Notice of Reasons for Rejection—App 2012104137—Partial Eng Tran.

*Primary Examiner* — Matthew Luu
*Assistant Examiner* — Rut Patel
(74) *Attorney, Agent, or Firm* — Banner & Witcoff, Ltd.

(57) ABSTRACT

There is provided an ink-jet recording apparatus, including: a water-based ink which contains glycol ether and water; and an element which is configured to contact with the water-based ink, is formed of a polyacetal resin, and contains aliphatic amide in an amount of less than 29 ppm by weight.

19 Claims, 2 Drawing Sheets

(56) References Cited

FOREIGN PATENT DOCUMENTS

| JP | 2000-513396 A | 10/2000 |
|---|---|---|
| JP | 2005035245 A | 2/2005 |
| JP | 2008-524400 A | 7/2008 |
| JP | 2008-246821 A | 10/2008 |
| JP | 2009-056679 A | 3/2009 |
| JP | 2009-515007 | 4/2009 |
| JP | 2010-167794 A | 8/2010 |
| JP | 2011230367 A | 11/2011 |

* cited by examiner

INK-JET RECORDING APPARATUS

CROSS REFERENCE TO RELATED APPLICATION

The present application claims priority from Japanese Patent Application No. 2012-104137, filed on Apr. 27, 2012, the disclosure of which is incorporated herein by reference in its entirety.

BACKGROUND OF THE INVENTION

1. Field of the Invention

The present invention relates to an ink-jet recording apparatus.

2. Description of the Related Art

In some cases, glycol ether is blended or contained in a water-based ink for ink-jet recording to enhance permeability to a recording medium. However, in some cases, the water-based ink in which the glycol ether is blended precipitates aliphatic amide which is contained, as a lubricant, in a resin component of an ink-jet recording apparatus making contact with the water-based ink. As a result, a problem arises such that clogging of a filter and/or nozzle(s) in an ink channel and the like is caused. In order to solve this problem, it has been suggested that the aliphatic amide in the resin component is reduced (Japanese Patent No. 2874691).

However, in a case that the aliphatic amide in the resin component is reduced, there is a problem such that mechanical strength of the ink channel of the resin component is decreased.

In view of the above, an object of the present teaching is to provide an ink-jet recording apparatus in which precipitation or deposition, of aliphatic amide in a resin component, in a water-based ink is suppressed even when the water-based ink having high permeability is used and in which decrease of mechanical strength of the resin component is also suppressed.

SUMMARY OF THE INVENTION

According to the present teaching, there is provided an ink-jet recording apparatus including: a water-based ink which contains glycol ether and water; and an element which is configured to contact with the water-based ink, is formed of a polyacetal resin, and contains aliphatic amide in an amount of less than 29 ppm by weight.

DESCRIPTION OF THE PREFERRED EMBODIMENTS

Figure 1:
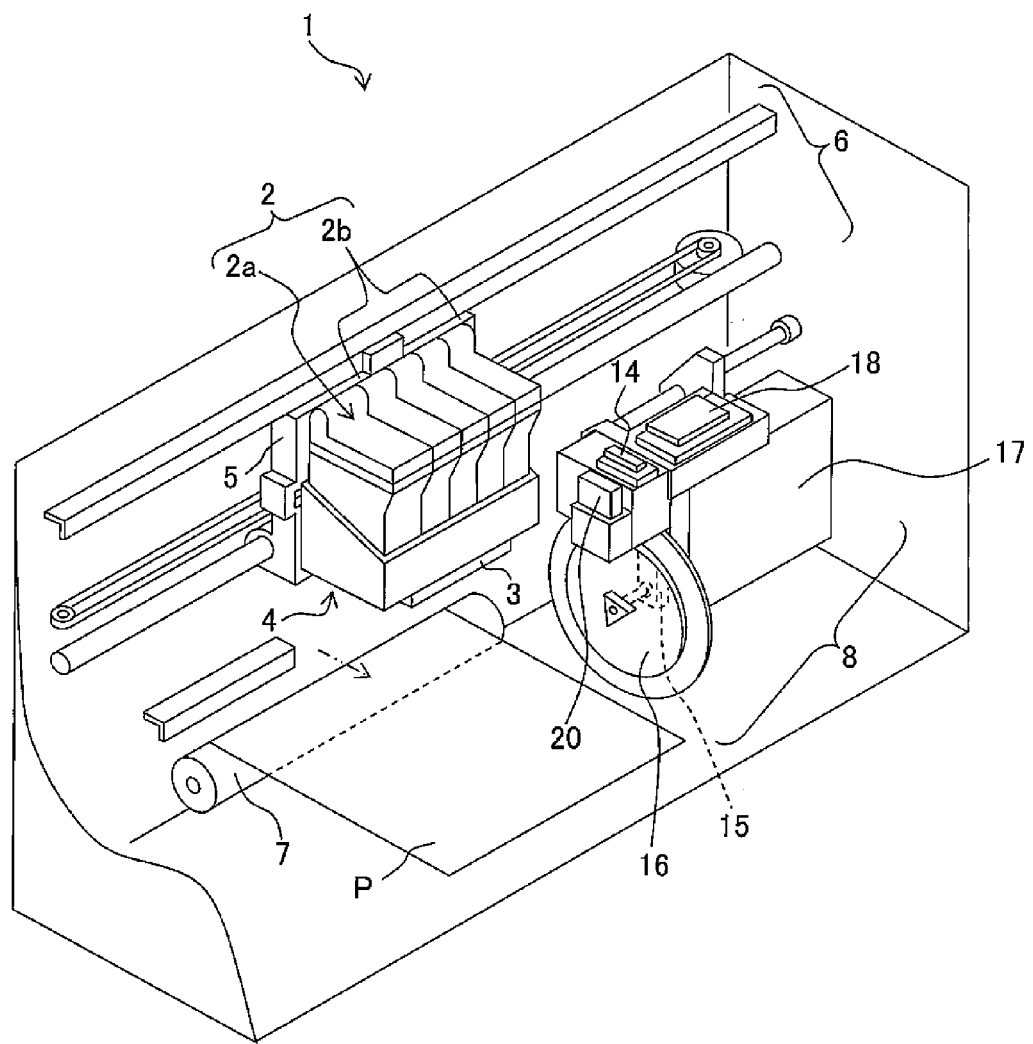
FIG. 1 is a schematic perspective view showing an example of a structure of an ink-jet recording apparatus of the present teaching.

The ink-jet recording apparatus of the present teaching is an ink-jet recording apparatus which includes a resin component making contact with a water-based ink for ink-jet recording (hereinafter referred to simply as "water-based ink" or "ink") as described above. The water-based ink contains glycol ether and water. The resin component includes a polyacetal resin component (an element or a part) formed of polyacetal resin. The aliphatic amide content in the polyacetal resin component is less than 29 ppm (ratio by weight).

The structure, the shape, etc., of the ink-jet recording apparatus of the present teaching are not especially limited, and the ink-jet recording apparatus may have any structure and shape and the like, provided that the ink-jet recording apparatus includes the resin component which makes contact with the water-based ink containing the glycol ether and water; that the resin component includes the polyacetal resin component formed of the polyacetal resin; and that the aliphatic amide content in the polyacetal resin component is less than 29 ppm (ratio by weight) (less than 29 ppm by weight). The ink-jet recording apparatus of the present teaching may include a resin component formed of a resin other than the polyacetal resin, instead of the polyacetal resin component. With respect to the resin component other than the polyacetal resin component, the aliphatic amide content may not be less than 29 ppm (ratio by weight) in order to maintain mechanical strength of the resin component.

In the ink-jet recording apparatus of the present teaching, it is allowable to make the polyacetal resin component (the element) having the aliphatic amide content of less than 29 ppm (ratio by weight) in-house or to use any commercially available product of the polyacetal resin component. The aliphatic amide content in the polyacetal resin component can be measured, for example, as follows. That is, the polyacetal resin component is dissolved in an organic solvent to prepare a solution, and the solution is used to perform liquid chromatography mass spectrometry (LC-MS), gas chromatography mass spectrometry (GC-MS), or the like. By making the aliphatic amide content be less than 29 ppm (ratio by weight), precipitation or deposition of the aliphatic amide in the water-based ink is suppressed even when a water-based ink containing the glycol ether and having high permeability is used. The aliphatic amide content is preferably not more than 25 ppm (ratio by weight), more preferably not more than 22 ppm (ratio by weight), further preferably not more than 20 ppm (ratio by weight), and especially preferably not more than 15 ppm (ratio by weight). Further, by including the polyacetal resin component as the resin component, decrease of the mechanical strength of the resin component is also suppressed.

Further, since the aliphatic amide is a lubricant for improving formability or moldability of the polyacetal resin component, in view of the formability or moldability, the aliphatic amide content in the polyacetal resin component is preferably not less than 8 ppm (ratio by weight). The polyacetal resin component of this embodiment has satisfactory formability or moldability and it is possible to suppress the precipitation or deposition of the aliphatic amide in the water-based ink containing the glycol ether, provided that the aliphatic amide content is not less than 8 ppm (ratio by weight) and less than 29 ppm (ratio by weight), and preferably 8 ppm to 15 ppm (ratio by weight).

The aliphatic amide is not specifically limited, which includes, for example, saturated fatty acid amide such as lauric acid amide, palmitin acid amide, and stearic acid amide; unsaturated aliphatic amide such as olein acid amide and erucic acid amide; saturated aliphatic bis-amide such as methylenebis stearic acid amide, ethylenebis lauric acid amide, and ethylenebis stearic acid amide; and unsaturated aliphatic bis-amide such as ethylenebis olein acid amide and ethylenebis erucic acid amide. One type (kind) of the aliphatic amide as described above may be used singly, or two or more types (kinds) of the aliphatic amides as described above may be used in combination.

In a case that the lubricant is added to the resin component, fluidity at the time of molding is generally improved and crystallization of polymer is more likely to be uniformized. In view of the above, the following assumption is made. That is, in a case that the lubricant is reduced beyond necessity, the fluidity at the time of molding is deteriorated and the polymer is crystallized ununiformly, thereby generating a portion, in the resin component, which has weak mechanical strength. The inventors of the present teaching, however, have found that the mechanical strength of the resin component is not decreased in the polyacetal resin component even when the content of aliphatic amide as the lubricant is made to be less than 29 ppm (ratio by weight) which is concentration below normal. The reason thereof is assumed that the polyacetal resin itself originally has excellent fluidity at the time of molding. Further, the inventors have also found out the following. That is, in a case that the aliphatic amide content is made to be less than 29 ppm (ratio by weight), the precipitation or deposition of the aliphatic amide in the water-based ink is suppressed in the polyacetal resin component, even when the water-based ink containing the glycol ether and having the high permeability is used. The degree of decrease of the mechanical strength and the precipitation amount of the aliphatic amide in the water-based ink are largely dependent on the type of resin, and thus they are not simply dependent only on the aliphatic amide content. Therefore, as described above, with respect to the resin component other than the polyacetal resin component, it is not indispensable that the aliphatic amide content is less than 29 ppm (ratio by weight).

In the ink-jet recording apparatus, the water-based ink containing the glycol ether and water makes contact with the resin component.

The glycol ether as described above is not specifically limited, which includes, for example, ethylene glycol methyl ether, ethylene glycol ethyl ether, ethylene glycol n-propyl ether, diethylene glycol methyl ether, diethylene glycol ethyl ether, diethylene glycol n-propyl ether, diethylene glycol n-butyl ether, diethylene glycol n-hexyl ether, triethylene glycol methyl ether, triethylene glycol ethyl ether, triethylene glycol n-propyl ether, triethylene glycol n-butyl ether, tetraethylene glycol n-butyl ether, propylene glycol methyl ether, propylene glycol ethyl ether, propylene glycol n-propyl ether, propylene glycol n-butyl ether, dipropylene glycol methyl ether, dipropylene glycol ethyl ether, dipropylene glycol n-propyl ether, dipropylene glycol n-butyl ether, tripropylene glycol methyl ether, tripropylene glycol ethyl ether, tripropylene glycol n-propyl ether, and tripropylene glycol n-butyl ether. One type (kind) of the glycol ether as described above may be used singly, or two or more types (kinds) of the glycol ethers as described above may be used in combination. Further, since the glycol ether has moderate solubility in water and improves printing quality, the glycol ether preferably contains at least one glycol ether selected from the group consisting of tetraethylene glycol n-butyl ether, triethylene glycol n-butyl ether, and dipropylene glycol n-propyl ether.

The blending amount of the glycol ether with respect to the total amount of the water-based ink is, for example, more than 0% by weight and not more than 20% by weight, preferably 0.1% by weight to 15% by weight, more preferably 0.5% by weight to 10% by weight, and further preferably 1.5% by weight to 4.0% by weight. In a case that the glycol ether contains at least one glycol ether selected from the group consisting of tetraethylene glycol n-butyl ether, triethylene glycol n-butyl ether, and dipropylene glycol n-propyl ether, the blending amount of glycol ether with respect to the total amount of the water-based ink is preferably 1.5% by weight to 4.0% by weight.

It is preferable that the water is ion exchange water or pure water (purified water). The blending amount of water (water ratio) with respect to the total amount of the water-based ink is, for example, 10% by weight to 90% by weight, and preferably 40% by weight to 80% by weight. The water ratio may be, for example, the balance of the other components.

The water-based ink may be a color ink containing a colorant or a colorless ink which does not contain the colorant. The colorant of the color ink may be any of a pigment and a dye. Further, the pigment and the dye may be mixed with each other to be used as the colorant.

The pigment includes, for example, carbon black, an inorganic pigment, and an organic pigment. The carbon black includes, for example, furnace black, lamp black, acetylene black, and channel black. The inorganic pigment includes, for example, titanium oxide, inorganic pigments based on iron oxide, and inorganic pigments based on carbon black. The organic pigment includes, for example, azo-pigments such as azo lake, insoluble azo-pigment, condensed azo-pigment, chelate azo-pigment and the like; polycyclic pigments such as phthalocyanine pigment, perylene and perynon pigments, anthraquinone pigment, quinacridone pigment, dioxadine pigment, thioindigo pigment, isoindolinone pigment, quinophthalone pigment and the like; dye lake pigments such as basic dye type lake pigment, acid dye type lake pigment and the like; nitro pigments; nitroso pigments; aniline black daylight fluorescent pigment; and the like. Any other pigment is also usable provided that the pigment is dispersible in a water phase (aqueous phase). Specific examples of the pigments as described above include, for example, C. I. Pigment Blacks 1, 6, and 7; C. I. Pigment Yellows 1, 2, 3, 12, 13, 14, 15, 16, 17, 55, 78, 150, 151, 154, 180, 185, and 194; C. I. Pigment Oranges 31 and 43; C. I. Pigment Reds 2, 3, 5, 6, 7, 12, 15, 16, 48, 48:1, 53:1, 57, 57:1, 112, 122, 123, 139, 144, 146, 149, 166, 168, 175, 176, 177, 178, 184, 185, 190, 202, 221, 222, 224, and 238; C. I. Pigment Violet 196; C. I. Pigment Blues 1, 2, 3, 15, 15:1, 15:2, 15:3, 15:4, 16, 22, and 60; C. I. Pigment Greens 7 and 36; and the like.

The pigment may be a self-dispersible pigment. The self-dispersible pigment is dispersible in water without using any dispersing agent, for example, owing to the fact that at least one of the hydrophilic functional group and the salt thereof including carbonyl group, hydroxyl group, carboxylic acid group, sulfonic acid group (sulfonate group), phosphoric acid group (phosphate group), etc. is introduced into the pigment particles by the chemical bond directly or via any other group. It is possible to use self-dispersible pigments subjected to the surface treatment by any one of methods described, for example, in Japanese Patent Application Laid-open No. 8-3498 (corresponding to U.S. Pat. No. 5,609,671), Published Japanese Translation of PCT International Publication for Patent Application No. 2000-513396 (corresponding to U.S. Pat. No. 5,837,045), Published Japanese Translation of PCT International Publication for Patent Application No. 2008-524400 (corresponding to United States Patent Application Publication No. 2006/0201380), and Published Japanese Translation of PCT International Publication for Patent Application No. 2009-515007 (corresponding to United States Patent Application Publication No. 2007/0100023 or United States Patent Application Publication No. 2007/0100024). It is possible to use, as a material for the self-dispersible pigment, either one of the inorganic pigment and the organic pigment. Further, a pigment which is suitable for the above-described treatment includes, for example, carbon black such as "MA8" and "MA100" produced by Mitsubishi Chemical Corporation. As the self-dispersible pigment, it is possible, for example, to use a commercially available product. The commercially available product includes, for example, "CAB-O-JET (trade name) 200", "CAB-O-JET (trade name) 250C", "CAB-O-JET (trade name) 260M", "CAB-O-JET (trade name) 270Y", "CAB-O-JET (trade name) 300", "CAB-O-JET (trade name) 400", "CAB-O-JET (trade name) 450C", "CAB-O-JET (trade name) 465M" and "CAB-O-JET (trade name) 470Y" produced by Cabot Specialty Chemicals; "BONJET (trade name) BLACK CW-2" and "BONJET (trade name) BLACK CW-3" produced by Orient Chemical Industries, Ltd.; "LIOJET (trade name) WD BLACK 002C" produced by Toyo Ink Mfg. Co., Ltd.; and the like.

The solid content blending amount of the pigment (pigment solid content) with respect to the entire amount of the color ink is not particularly limited, and may be appropriately determined based on, for example, desired optical density or color (hue, tint), etc. The pigment solid content is, for example, 0.1% by weight to 20% by weight, is preferably 1% by weight to 10% by weight, and is more preferably 2% by weight to 8% by weight.

The dye is not specifically limited, which is exemplified, for example, by direct dyes, acid dyes, basic dyes, and reactive dyes. Specified examples of the dyes include, for example, C. I. Direct Black, C. I. Direct Blue, C. I. Direct Red, C. I. Direct Yellow, C. I. Direct Orange, C. I. Direct Violet, C. I. Direct Brown, C. I. Direct Green, C. I. Acid Black, C. I. Acid Blue, C. I. Acid Red, C. I. Acid Yellow, C. I. Acid Orange, C. I. Acid Violet, C. I. Basic Black, C. I. Basic Blue, C. I. Basic Red, C. I. Basic Violet, and C. I. Food Black. C. I. Direct Black is exemplified, for example, by C. I. Direct Blacks 17, 19, 32, 51, 71, 108, 146, 154, and 168. C. I. Direct Blue is exemplified, for example, by C. I. Direct Blues 6, 22, 25, 71, 86, 90, 106, and 199. C. I. Direct Red is exemplified, for example, by C. I. Direct Reds 1, 4, 17, 28, 83, and 227. C. I. Direct Yellow is exemplified, for example, by C. I. Direct Yellows 12, 24, 26, 86, 98, 132, 142, and 173. C. I. Direct Orange is exemplified, for example, by C. I. Direct Oranges 34, 39, 44, 46, and 60. C. I. Direct Violet is exemplified, for example, by C. I. Direct Violets 47 and 48. C. I. Direct Brown is exemplified, for example, by C. I. Direct Brown 109. C. I. Direct Green is exemplified, for example, by C. I. Direct Green 59. C. I. Acid Black is exemplified, for example, by C. I. Acid Blacks 2, 7, 24, 26, 31, 52, 63, 112, and 118. C. I. Acid Blue is exemplified, for example, by C. I. Acid Blues 9, 22, 40, 59, 90, 93, 102, 104, 117, 120, 167, 229, and 234. C. I. Acid Red is exemplified, for example, by C. I. Acid Reds 1, 6, 32, 37, 51, 52, 80, 85, 87, 92, 94, 115, 180, 256, 289, 315, and 317. C. I. Acid Yellow is exemplified, for example, by C. I. Acid Yellows 11, 17, 23, 25, 29, 42, 61, and 71. C. I. Acid Orange is exemplified, for example, by C. I. Acid Oranges 7 and 19. C. I. Acid Violet is exemplified, for example, by C. I. Acid Violet 49. C. I. Basic Black is exemplified, for example, by C. I. Basic Black 2. C. I. Basic Blue is exemplified, for example, by C. I. Basic Blues 1, 3, 5, 7, 9, 24, 25, 26, 28, and 29. C. I. Basic Red is exemplified, for example, by C. I. Basic Reds 1, 2, 9, 12, 13, 14, and 37. C. I. Basic Violet is exemplified, for example, by C. I. Basic Violets 7, 14, and 27. C. I. Food Black is exemplified, for example, by C. I. Food Blacks 1 and 2.

The blending amount of the dye with respect to the total amount of the color ink is not specifically limited, which is, for example, 0.1% by weight to 20% by weight and preferably 0.3% by weight to 10% by weight.

One type (kind) of the colorant of the color ink may be used singly. Alternatively, two or more types (kinds) of the colorants may be used in combination.

The colorless ink may contain a coagulant or coagulating agent. The coagulant is exemplified, for example, by polyvalent metal salt, cationic polymer, and cationic surfactant.

Specific examples of the polyvalent metal salt include, for example, aluminum chloride, aluminum bromide, aluminum sulfate, aluminum nitrate, aluminum acetate, barium chloride, barium bromide, barium iodide, barium oxide, barium nitrate, barium thiocyanate, calcium chloride, calcium bromide, calcium iodide, calcium nitrite, calcium nitrate, calcium dihydrogen phosphate, calcium thiocyanate, calcium lactate, calcium fumarate, calcium citrate, copper chloride, copper bromide, copper sulfate, copper nitrate, copper acetate, iron chloride, iron bromide, iron iodide, iron sulfate, iron nitrate, iron oxalate, iron lactate, iron fumarate, iron citrate, magnesium chloride, magnesium bromide, magnesium iodide, magnesium sulfate, manganese sulfate, manganese nitrate, manganese dihydrogen phosphate, manganese acetate, manganese salicylate, manganese benzoate, manganese lactate, nickel chloride, nickel bromide, nickel sulfate, nickel nitrate, nickel acetate, stannum sulfate, titanium chloride, zinc chloride, zinc bromide, zinc sulfate, zinc nitrate, zinc thiocyanate, and zinc acetate. Among them, it is preferable to use polyvalent metal salts of calcium and magnesium. In view of the degree of aggregation of the colorant contained in the color ink used together with the colorless ink, it is preferable to use a divalent metal salt.

The cationic polymer described above is exemplified, for example, by polyamine, polyallylamine, polyethyleneimine, polyvinylamine, polyvinylpyridine, polyethyleneimine-epichlorohydrin reaction product, polyamide-polyamine resin, polyamide-epichlorohydrin resin, cationic starch, polyvinyl alcohol, polyvinylpyrrolidone, polyamidine, cationic epoxy resin, polyacrylamide, polyacrylic acid ester, polymethacrylic acid ester, polyvinyl formamide, aminoacetalized polyvinyl alcohol, polyvinyl benzyl onium, dicyandiamide-formalin polycondensate, dicyandiamide-diethylenetriamine polycondensate, epichlorohydrin-dimethylamine addition polymer, dimethyldiallylammonium chloride-$SO_2$ copolymer, dimethyldiallylammonium chloride polymer, and derivatives thereof. Further, the cationic polymer described above is also exemplified, for example, by a polymer of single monomer or a copolymer of a plurality of monomers composed of at least one of water-soluble monomers including, for example, dimethylaminoethyl methacrylate (DM), methacryloxyethyl trimethyl ammonium chloride, methacryloxyethyl benzyl dimethyl ammonium chloride, dimethylaminoethyl acrylate (DA), acryloyloxyethyl trimethyl ammonium chloride (DMQ), acryloyloxyethyl benzyl dimethyl ammonium chloride (DABC), dimethylaminopropyl acrylamide (DMAPAA), and acrylamide propyl trimethyl ammonium chloride (DMAPAAQ). Among them, it is preferable to use polyamine, polyallylamine, and polyethyleneimine.

The cationic surfactant described above is exemplified, for example, by primary, secondary, and tertiary amine salt type compounds, alkylamine salt, dialkylamine salt, aliphatic amine salt, benzalkonium salt, quaternary ammonium salt, quaternary alkylammonium salt, alkylpyridinium salt, imidazolinium salt, sulfonium salt, phosphonium salt, and onium salt. Specifically, it is possible to exemplify, for example, hydrochloride and acetate of, for example, laurylamine, coco amine, and rosin amine, lauryl trimethyl ammonium chloride, cetyl trimethyl ammonium chloride, benzyl tributyl ammonium chloride, benzalkonium chloride, dimethyl ethyl lauryl ammonium ethylsulfate, dimethyl ethyl octyl ammonium ethylsulfate, trimethyl lauryl ammonium hydrochloride, cetyl pyridinium chloride, cetyl pyridinium bromide, dihydroxyethyllaurylamine, decyl dimethyl benzyl ammonium chloride, dodecyl dimethyl benzyl ammonium chloride, tetradecyl dimethyl ammonium chloride, hexadecyl dimethyl ammonium chloride, and octadecyl dimethyl ammonium chloride. Among them, it is preferable to use dimethyl ethyl lauryl ammonium ethylsulfate, dimethyl ethyl octyl ammonium ethylsulfate, trimethyl lauryl ammonium hydrochloride, dodecyl dimethyl ammonium chloride, and tetradecyl dimethyl ammonium chloride.

The blending amount of the coagulant with respect to the total amount of the colorless ink is not specifically limited. For example, in the case of the polyvalent metal salt, the blending amount is, for example, 1% by weight to 30% by weight, and preferably 5% by weight to 25% by weight. For example, in the case of the cationic polymer, the blending amount is, for example, 0.1% by weight to 15% by weight, and preferably 1% by weight to 10% by weight. For example, in the case of the cationic surfactant, the blending amount is, for example, 1% by weight to 30% by weight, and preferably 1% by weight to 25% by weight. One coagulant as described above may be used singly. Alternatively, two or more of the coagulants described above may be used in combination.

The water-based ink may further contain a humectant. The humectant described above is not specifically limited, which includes, for example, lower alcohols such as methyl alcohol, ethyl alcohol, n-propyl alcohol, isopropyl alcohol, n-butyl alcohol, sec-butyl alcohol, and tert-butyl alcohol; amides such as dimethylformamide and dimethylacetamide; ketones such as acetone; ketoalcohols (ketone alcohols) such as diacetone alcohol; ethers such as tetrahydrofuran and dioxane; polyhydric alcohols such as polyalkylene glycol, alkylene glycol, glycerol and trimethylolpropane; 2-pyrrolidone; N-methyl-2-pyrrolidone; and 1,3-dimethyl-2-imidazolidinone. The polyalkylene glycol includes, for example, polyethylene glycol and polypropylene glycol. The alkylene glycol includes, for example, ethylene glycol, propylene glycol, butylene glycol, diethylene glycol, triethylene glycol, dipropylene glycol, tripropylene glycol, thiodiglycol, and hexylene glycol. One type (kind) of the humectant as described above may be used singly, or two or more types (kinds) of the humectants as described above may be used in combination. Among them, it is preferable to use polyhydric alcohol such as alkylene glycol and glycerol.

The blending amount of the humectant with respect to the total amount of the water-based ink is, for example, 0% by weight to 95% by weight, preferably 5% by weight to 80% by weight, and more preferably 5% by weight to 50% by weight.

The water-based ink may further contain conventionally known additives, if necessary. The additive includes, for example, surfactants, pH-adjusting agents, viscosity-adjusting agents, surface tension-adjusting agents, and fungicides. The viscosity-adjusting agent is exemplified, for example, by polyvinyl alcohol, cellulose, and water-soluble resin.

The water-based ink can be prepared, for example, as follows. That is, the glycol ether, water, and other additive component(s) as necessary are mixed uniformly in accordance with any conventionally known method, and then undissolved matters are removed by a filter or the like.

Next, an explanation will be made about an ink-jet recording apparatus of the present teaching and an ink-jet recording method using the ink-jet recording apparatus. The recording includes, for example, printing of letters (text), printing of images, printing, etc.

FIG. 1 shows an exemplary construction of an ink-jet recording apparatus of the present teaching. As shown in FIG. 1, an ink-jet recording apparatus 1 includes, as main constitutive elements, an ink cartridge assembly 2, an ink discharging mechanism (ink-jet head 3), a head unit 4, a carriage 5, a driving unit 6, a platen roller 7, and a purge unit 8. Of the constitutive elements as described above, for example, at least one constitutive element contacting with the water-based ink, such as the ink-jet head 3, includes the polyacetal resin component. The polyacetal resin component has high mechanical strength and self-lubricating property, and thus wear resistance and sliding performance thereof are superior. Further, accuracy of dimension and resistance to solvents of the polyacetal resin are also superior. In the ink-jet recording apparatus, the polyacetal resin is widely used, for example, in a gear, a frame, a cap, and a pump in view of various excellent characteristics.

The ink cartridge assembly 2 includes a colorless ink cartridge (ink accommodating section) 2a and four color ink cartridges (ink accommodating sections) 2b. The colorless ink cartridge 2a contains the colorless ink. Each of the four color ink cartridges 2b contains one of the four color water-based inks of yellow, magenta, cyan, and black. In this embodiment, the water-based ink containing the glycol ether and water is used for all of the four color water-based inks.

For example, any conventionally known ink cartridges can be used for the ink cartridges 2a and 2b (see, for example, Japanese Patent Application Laid-open No. 2009-56679 corresponding to United States Patent Application Publication No. 2009/0058963). The ink cartridges 2a and 2b include ink containers (not shown) containing the inks as described above, respectively, and a frame constructing a casing of each ink container may be the polyacetal resin component.

The ink-jet head 3, which is installed on the head unit 4, performs recording by discharging the water-based inks accommodated in the ink cartridges (ink accommodating sections) 2a and 2b on a recording medium P (for example, recording paper sheet). For example, any conventionally known ink-jet head can be used for the ink-jet head 3 (see, for example, Japanese Patent Application Laid-open No. 2010-167794). The ink-jet head 3 may be an ink-jet head which includes a head body and a reservoir unit storing the ink(s) temporarily. For example, the reservoir unit may contain the polyacetal resin component.

The ink cartridge assembly 2 and the head unit 4 are carried on the carriage 5. The driving unit 6 reciprocatively moves the carriage 5 in a linear direction. For example, any conventionally known driving unit can be used for the driving unit 6 (see, for example, Japanese Patent Application Laid-open No. 2008-246821 corresponding to United States Patent Application Publication No. 2008/0241398). The platen roller 7 extends in the reciprocating direction of the carriage 5, and the platen roller 7 is arranged to face or to be opposite to the ink-jet head 3.

The purge unit 8 sucks any defective ink containing bubbles or the like remaining at the inside of the ink-jet head 3. For example, any conventionally known purge unit can be used for the purge unit 8 (see, for example, Japanese Patent Application Laid-open No. 2008-246821 corresponding to United States Patent Application Publication No. 2008/0241398).

The purge unit 8 is provided on the side of the platen roller 7. The purge unit 8 is arranged so that the purge unit 8 is opposite to or facing the ink-jet head 3 when the head unit 4 is at a reset position (disposed over or above the purge unit 8 in this embodiment). The purge unit 8 includes a purge cap 14, a pump 15, a cam 16, and an ink storage section 17. The purge cap 14 covers an ink discharging surface, of the ink-jet head 3 at the reset position, having a plurality of nozzles (not shown) thereon, when the ink in the ink-jet head 3 is sucked. The pump 15 sucks any defective ink containing bubbles or the like stored or accumulated in the ink-jet head 3, in accordance with the driving of the cam 16. Accordingly, the ink-jet head 3 is restored. The sucked defective ink is stored in the ink storage section 17. In this embodiment, for example, the purge cap 14 and the pump 15 may be the polyacetal resin component.

A wiper member 20 is arranged adjacently to the purge unit 8 at a portion of the purge unit 8 on a side of the platen roller 7. The wiper member 20 is formed to have a spatula-shaped form. The wiper member 20 wipes a nozzle-formed surface of the ink-jet head 3 in accordance with the movement of the carriage 5. In FIG. 1, in a case that the recording is completed, that is, in a case that no water-based ink is discharged from the ink-jet head 3 (ink discharging mechanism), a nozzle cap 18 covers the nozzle-formed surface (ink discharging surface), of the ink-jet head 3 to be returned to the reset position, having the plurality of nozzles thereon in order to prevent the colorless water-based ink and the color water-based inks from being dried. In this embodiment, for example, the nozzle cap 18 may be the polyacetal resin component.

As described above, in the ink-jet recording apparatus 1, at least one of the ink cartridges (ink accommodating sections) 2a and 2b, the ink-jet head 3 (ink discharging mechanism), the purge cap 14, and the purge unit 8 may include the polyacetal resin component. Further, in the purge unit 8, at least one of the purge cap 14 and the pump 15 may be the polyacetal resin component. Further, the ink cartridges (ink accommodating sections) 2a and 2b may include ink containers accommodating the inks therein, respectively, and the frame constructing the casing of each ink container may be the polyacetal resin component.

In the ink-jet recording apparatus 1 of this embodiment, the ink cartridge assembly 2 is carried on one carriage 5 together with the head unit 4. However, the present teaching is not limited to this. In the ink-jet recording apparatus described above, the respective cartridges of the ink cartridge assembly 2 may be carried on any carriage distinctly from the head unit 4. Alternatively, the respective cartridges of the ink cartridge assembly 2 may be arranged and fixed in the ink-jet recording apparatus without being carried on the carriage 5. In the aspects as described above, for example, the respective cartridges of the ink cartridge assembly 2 are connected to the head unit 4 carried on the carriage 5 by tubes or the like, and the colorless water-based ink and the color water-based inks are supplied from respective cartridges of the ink cartridge assembly 2 to the head unit 4.

Figure 2A:
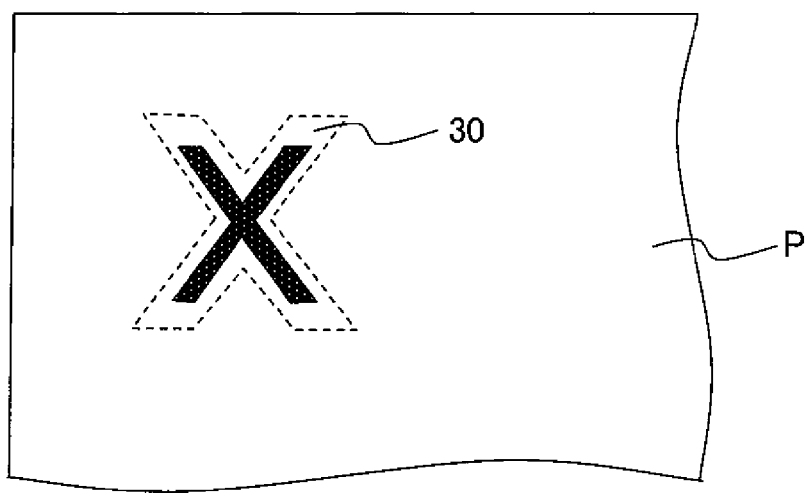
FIGS. 2A and 2B are diagrams each showing a recording example by an ink-jet recording method using the ink-jet recording apparatus of the present teaching.
Figure 2B:
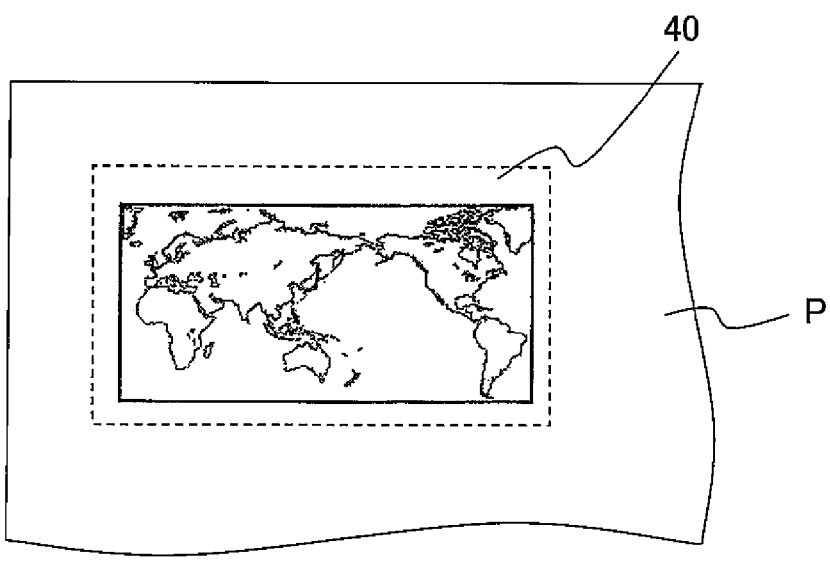

Ink-jet recording using the ink-jet recording apparatus 1 is performed, for example, in the following manner. Namely, at first, the colorless ink is applied (discharged) to the recording paper sheet P from the ink-jet head 3. The colorless ink may be applied on an entire surface of a recording surface of the recording paper sheet P or on a partial portion (a part) of the recording surface. In a case of applying the colorless ink to the partial portion of the recording surface of the recording paper sheet P, at least a portion, of the recording surface of the recording paper sheet P, on which the recording is to be performed with the color ink, is an application portion. In the case of applying the colorless ink to the partial portion of the recording surface, the size (dimension) of the application portion is preferably greater than that of the recording portion. For example, as shown in FIG. 2A, in a case that a letter "X" is to be recorded on the recording paper sheet P, it is preferable that the colorless ink is applied so that an application portion 30 is formed with a line width greater than the line width of the letter "X". Further, as shown in FIG. 2B, in a case that a pattern, an image, etc. is to be recorded on the recording paper sheet P, it is preferable that the colorless ink is applied so that an application portion 40 is formed to be greater than the pattern, etc.

Next, the color ink is discharged from the ink-jet head 3 to the application portion, of the recording paper sheet P, on which the colorless ink has been applied. The time (time interval) from the discharge of the colorless ink until the discharge of the color ink is not particularly limited. For example, it is allowable to perform the discharge of the color ink in a same scanning during which the discharge of the colorless ink is also performed. According to the ink-jet recording apparatus of the present teaching, even when the colorless and color inks containing the glycol ether and having high permeability are used, precipitation or deposition of the aliphatic amide in the colorless and color inks is suppressed and the decrease of the mechanical strength of the resin component is also suppressed.

As in this embodiment, it is preferable that the colorless ink is used as a pre-treatment solution which is applied to the recording paper sheet P before the color ink is discharged to the recording paper sheet P. The present teaching, however, is not limited to this. In the present teaching, it is allowable to discharge the colorless ink to the recording paper sheet P after the color ink has been discharged to the recording paper sheet P; or it is allowable to perform the discharge of the colorless ink to the recording paper sheet P and the discharge of the color ink to the recording paper sheet P at the same time.

The recording paper sheet P on which the recording has been performed in such a manner is discharged from the ink-jet recording apparatus 1. In FIG. 1, illustrations of a paper feeding mechanism and a paper discharging mechanism for the recording paper sheet P are omitted.

In the apparatus shown in FIG. 1, an ink-jet head of serial type (serial type ink-jet head) is adopted. However, the present teaching is not limited to this. The ink-jet recording apparatus may be an apparatus adopting an ink-jet head of line type (line type ink-jet head).

In this embodiment, the water-based ink containing the glycol ether and water is used for all of the four inks. The present teaching, however, is not limited thereto. At least one or more inks, of the four inks, may be the water-based ink(s) containing the glycol ether and water. Alternatively, only the colorless ink may be the water-based ink containing the glycol ether and water or only the color inks may be the water-based inks containing the glycol ether and water.

The ink-jet recording apparatus of the present teaching includes the polyacetal resin component as the resin component, and the aliphatic amide content in the polyacetal resin component is less than 29 ppm (ratio by weight). Thus, even when the water-based ink containing the glycol ether and having the high permeability is used, the precipitation or deposition of the aliphatic amide in the water-based ink is suppressed and the decrease of the mechanical strength of the resin component is also suppressed.

In the ink-jet recording apparatus of this embodiment, the water-based ink may contain at least one glycol ether selected from the group consisting of tetraethylene glycol n-butyl ether, triethylene glycol n-butyl ether, and dipropylene glycol n-propyl ether in an amount of 1.5% by weight to 4.0% by weight, and the polyacetal resin component may contain the aliphatic amide in an amount of not less than 8 ppm by weight and less than 29 ppm by weight.

EXAMPLES

Next, examples of the present teaching will be explained. Note that the present teaching is not limited to and is not restricted by the examples which will be described below.

[Preparation of Water-Based Inks 1 to 4, 10 and 11]

Components except for a self-dispersible pigment, which were included in Composition of water-based ink (TABLE 1), were mixed uniformly or homogeneously; and thus an ink solvent was obtained. Subsequently, the ink solvent was added to each of the self-dispersible pigment water dispersions, followed by being mixed uniformly. After that, the obtained mixtures were each filtrated through a cellulose acetate membrane filter (pore size 3.00 μm) produced by Toyo Roshi Kaisha, Ltd., and thus the water-based inks for ink-jet recording 1 to 4, 10, and 11 used in the Examples were obtained.

[Preparation of Water-Based Inks 5 to 9]

Components which were included in Composition of water-based ink (TABLE 1) were mixed uniformly or homogeneously. After that, the obtained mixtures were each filtrated through a hydrophilic polytetrafluoroethylene (PTFE) type membrane filter (pore diameter: 0.20 μm) produced by Toyo Roshi Kaisha, Ltd., and thus the water-based inks for ink-jet recording 5 to 9 used in the Examples were obtained.

solid recording, a time before each of the water-based inks was disappeared from the paper surface was measured. Then, the drying property on the paper surface was evaluated in accordance with the following evaluation criteria. With respect to an ink set 5 as shown in Table 2, the drying property on the paper surface was evaluated as described above, except that a colorless ink 9 was discharged before discharging the water-based inks 1 to 4 constituting the ink set 5.

<Evaluation Criteria for Evaluation of Drying Property on the Paper Surface>

A: The water-based ink was disappeared from the paper surface within 5 seconds

B: The water-based ink was disappeared from the paper surface in a period after 5 seconds and within 10 seconds C: The water-based ink was disappeared from the paper surface after 10 seconds (b) Evaluation of Printing Quality (Bleeding)

A Black line using the water-based ink 1, 5, 10, or 11 as shown in Table 2 was recorded, on each of the recording paper sheets 1 to 6 as shown in table 2, by using the digital multi-

TABLE 1

| | | Water-based ink | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Composition of water-based ink (% by weight) | CAB-O-JET (trade name) 300 (*1) | 33.3 (5.0) | — | — | — | — | — | — | — | — | 33.3 (5.0) | 33.3 (5.0) |
| | CAB-O-JET (trade name) 270Y (*2) | — | 30.0 (3.0) | — | — | — | — | — | — | — | — | — |
| | CAB-O-JET (trade name) 260M (*3) | — | — | 40.0 (4.0) | — | — | — | — | — | — | — | — |
| | CAB-O-JET (trade name) 250C (*4) | — | — | — | 30.0 (3.0) | — | — | — | — | — | — | — |
| | C.I. Food Black 2 | — | — | — | — | 3.0 | — | — | — | — | — | — |
| | C.I. Direct Yellow 86 | — | — | — | — | — | 3.0 | — | — | — | — | — |
| | C.I. Acid Red 52 | — | — | — | — | — | — | 3.0 | — | — | — | — |
| | C.I. Direct Blue 199 | — | — | — | — | — | — | — | 3.0 | — | — | — |
| | N,N,N-dimethyl ethyl lauryl ammonium ethylsulfate | — | — | — | — | — | — | — | — | 3.0 | — | — |
| | Glycerol | 27.0 | 30.0 | 26.0 | 31.0 | 31.0 | 35.0 | 35.0 | 35.0 | 37.0 | 30.0 | 30.0 |
| | Dipropylene glycol n-propyl ether | 2.0 | — | — | 2.5 | — | — | 1.5 | — | — | — | — |
| | Triethylene glycol n-butyl ether | — | 4.0 | — | — | 4.0 | — | — | 3.0 | 2.0 | — | — |
| | Tetraethylene glycol n-butyl ether | — | — | 4.0 | — | — | 4.0 | — | — | — | — | — |
| | sodium polyoxyethylene lauryl ether sulfate (*5) | 0.2 | — | — | — | — | — | 0.2 | 0.4 | — | 1.0 | — |
| | ORFIN (trade name) E1010 (*6) | 0.2 | — | — | — | — | — | 0.5 | — | 0.5 | — | 0.5 |
| | Water | balance | balance | balance | balance | balance | balance | balance | balance | balance | balance | balance |

In TABLE 1:
(*1): self-dispersible pigment, manufactured by Cabot Specialty Chemicals; carbon black concentration: 15% by weight, number in parenthesis indicates pigment solid content amount
(*2): self-dispersible pigment, manufactured by Cabot Specialty Chemicals; C.I. Pigment Yellow 74 concentration: 10% by weight, number in parenthesis indicates pigment solid content amount
(*3): self-dispersible pigment, manufactured by Cabot Specialty Chemicals; C.I. Pigment Red 122 concentration: 10% by weight, number in parenthesis indicates pigment solid content amount
(*4): self-dispersible pigment, manufactured by Cabot Specialty Chemicals; C.I. Pigment Blue 15:3 concentration: 10% by weight, number in parenthesis indicates pigment solid content amount
(*5): Average polymerization degree of polyoxyethylene = 12
(*6): Acetylene diol ethylene oxide (10 mol) adduct, produced by Nissin Chemical Industry Co., Ltd The water-based inks 1 to 11 were used to perform (a) evaluation of drying property on the paper surface, (b) evaluation of printing quality (bleeding), and (c) evaluation of precipitation or deposition in the following methods.

(a) Evaluation of Drying Property on the Paper Surface

Solid recording (printing) of 100% was performed at 600 dpi on recording paper sheets 1 to 6 as shown in Table 2, by discharging water-based inks 1 to 11 which constitute ink sets 1 to 4 as shown in Table 2 using a digital multifunction machine MFC-J6710CDW provided with an ink-jet printer produced by Brother Industries, Ltd. After performing the function machine MFC-J6710CDW provided with the ink-jet printer, to prepare an evaluation sample 1 having a solid color background. Further, an evaluation sample 2 was prepared in a similar manner as that of the evaluation sample 1, except that a patch, in which the black line using the water-based ink 1, 5, 10, or 11 as shown in Table 2 was formed, was recorded in a yellow area formed with the water-based yellow ink constituting the ink sets 1 to 4 as shown in Table 2. Raggedness of the black lines of the evaluation samples 1 and 2 was measured by a handheld image analysis system "PIAS (trade name)-II" to obtain difference in Raggedness between the evaluation samples 1 and 2, and the printing quality (bleeding) was evaluated according to the following evaluation criteria. The measurement of Raggedness was performed six times per each recording paper sheet in conformity with ISO-13660. Here, the measurement result of each recording paper sheet was an average value of values obtained by six times measurements. With respect to the ink set 5 as shown in Table 2, the printing quality (bleeding) was evaluated as described above, except that the colorless ink 9 was discharged before discharging the water-based ink 1 and the water-based yellow ink (water-based ink 2) constituting the ink set 5.

<Evaluation Criteria for Printing Quality (Bleeding) Evaluation>
A: Difference in Raggedness was less than 10 μm
B: Difference in Raggedness was not less than 10 μm and less than 20 μm
C: Difference in Raggedness was not less than 20 μm (c) Evaluation of Precipitation or Deposition There were prepared test pieces, which were made of polyacetal resins having aliphatic amide contents (ratio by weight) of 8 ppm, 15 ppm, 29 ppm, and 65 ppm as shown in Table 3 respectively and have a size of 62.5 mm×12.7 mm×3.2 mm. The seven test pieces were immersed in 70 g of the water-based inks 1 to 11 in airtight containers and were left to stand for 2 weeks under an environment of temperature: 60° C. After cooling the airtight containers left for 2 weeks, the water-based inks 1 to 11 were sampled from the bottoms of the airtight containers. Then, presence or absence of precipitate was confirmed by using a ×200 magnification optical microscope. In a case that no precipitate was confirmed, the evaluation was regarded as "G"; in a case that any precipitate was confirmed, the evaluation was regarded as "NG". Noted that the aliphatic amide contained in each of the test pieces was ethylenebis stearic acid amide.

Evaluation results for the evaluation of the drying property on the paper surface and the printing quality (bleeding) evaluation are shown in Table 2. Further, evaluation results for the evaluation of precipitation or deposition are shown in Table 3.

TABLE 2

| | | Ink set 1 Water-based ink | | | | Ink set 2 Water-based ink | | | | Ink set 3 Water-based ink | | | |
|---|---|---|---|---|---|---|---|---|---|---|---|---|---|
| | | 1 | 2 | 3 | 4 | 5 | 6 | 7 | 8 | 10 | 2 | 3 | 4 |
| Drying property on paper surface | Recording Paper sheet 1 (*7) | A | A | A | A | A | A | A | A | B | A | A | A |
| | Recording Paper sheet 2 (*8) | A | A | A | A | A | A | A | A | A | A | A | A |
| | Recording Paper sheet 3 (*9) | A | A | A | A | A | A | A | A | C | A | A | A |
| | Recording Paper sheet 4 (*10) | B | B | B | B | A | A | A | A | C | B | B | B |
| | Recording Paper sheet 5 (*11) | A | A | A | A | A | A | A | A | A | A | A | A |
| | Recording Paper sheet 6 (*12) | A | A | A | A | A | A | A | A | C | A | A | A |
| Printing quality (bleeding) | Recording Paper sheet 1 (*7) | | A | | | | A | | | | B | | |
| | Recording Paper sheet 2 (*8) | | B | | | | A | | | | B | | |
| | Recording Paper sheet 3 (*9) | | A | | | | A | | | | C | | |
| | Recording Paper sheet 4 (*10) | | A | | | | B | | | | C | | |
| | Recording Paper sheet 5 (*11) | | A | | | | A | | | | B | | |
| | Recording Paper sheet 6 (*12) | | B | | | | A | | | | C | | |

| | | Ink set 4 Water-based ink | | | | Ink set 5 Water-based ink | | | | |
|---|---|---|---|---|---|---|---|---|---|---|
| | | 11 | 2 | 3 | 4 | 1 | 2 | 3 | 4 | 9 |
| Drying property on paper surface | Recording Paper sheet 1 (*7) | A | A | A | A | A | A | A | A | A |
| | Recording Paper sheet 2 (*8) | A | A | A | A | A | A | A | A | A |
| | Recording Paper sheet 3 (*9) | A | A | A | A | A | A | A | A | A |
| | Recording Paper sheet 4 (*10) | C | B | B | B | B | B | B | B | A |
| | Recording Paper sheet 5 (*11) | A | A | A | A | A | A | A | A | A |
| | Recording Paper sheet 6 (*12) | B | A | A | A | B | A | B | B | A |
| Printing quality (bleeding) | Recording Paper sheet 1 (*7) | | B | | | | A | | | |
| | Recording Paper sheet 2 (*8) | | B | | | | A | | | |
| | Recording Paper sheet 3 (*9) | | B | | | | A | | | |
| | Recording Paper sheet 4 (*10) | | C | | | | A | | | |
| | Recording Paper sheet 5 (*11) | | A | | | | A | | | |
| | Recording Paper sheet 6 (*12) | | C | | | | A | | | |

(*7) Produced by Xerox Corporation (4200)
(*8) Produced by International Paper Company (Hammermill)
(*9) Produced by NBS Ricoh Co., Ltd (My paper)
(*10) Produced by Steinbeis Temming Papier GmbH & Co. (Classic White)
(*11) Produced by Office Depot, Inc. (Multipurpose Paper)
(*12) Produced by FUJITSU COWORCO LIMITED (Office Paper)

TABLE 3

| | Aliphatic amide content | Water-based inks | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Evaluation of precipitation | 8 ppm | G | G | G | G | G | G | G | G | G | G | G |
| | 15 ppm | G | G | G | G | G | G | G | G | G | G | G |

TABLE 3-continued

| | Aliphatic amide content | Water-based inks | | | | | | | | | | |
|---|---|---|---|---|---|---|---|---|---|---|---|---|
| | | 1 | 2 | 3 | 4 | 5 | 6 | 7 | 8 | 9 | 10 | 11 |
| or deposition | 29 ppm | NG | NG | NG | NG | NG | NG | NG | NG | NG | G | G |
| | 65 ppm | NG | NG | NG | NG | NG | NG | NG | NG | NG | G | G |

As shown in Table 2, the ink sets 1, 2, and 5 constituted by the water-based inks 1 to 9 containing the glycol ether had superior evaluation results with respect to the evaluation of the drying property on the paper surface and the evaluation of the printing quality (bleeding). On the other hand, the ink sets 3 and 4 respectively constituted by the water-based ink 10 and 11, which did not contain the glycol ether, had inferior evaluation results with respect to the evaluation of the drying property on the paper surface and the evaluation of the printing quality (bleeding) in some cases.

As shown in Table 3, in the polyacetal resins having the aliphatic amide contents of less than 29 ppm (ratio by weight), in other words, in the respective polyacetal resins having the aliphatic amide contents of 15 ppm (ratio by weight) and 8 ppm (ratio by weight), no precipitation or deposition was generated in any of the water-based inks 1 to 11 and there was no problem in formability or moldability. On the other hand, in the polyacetal resins having the aliphatic amide contents of not less than 29 ppm (ratio by weight), precipitation or deposition was generated in the water-based inks 1 to 11 containing the glycol ether. From the result described above, it was found that the polyacetal resin having the aliphatic amide content of less than 29 ppm (ratio by weight) had no problem in the formability or moldability, and that no precipitation or deposition was generated even when the polyacetal resin having the aliphatic amide content of less than 29 ppm (ratio by weight) contacted with the ink containing the glycol ether.

Further, even in the case of the polyacetal resins having the aliphatic amide contents of not less than 29 ppm (ratio by weight), no precipitation or deposition was confirmed in the water-based inks 10 and 11 which did not contain the glycol ether. From the result described above, it was confirmed that aliphatic amide concentration in the polyacetal resin had a problem only when the water-based ink contained the glycol ether.

In a bending or flexural creep test by three-point loading in accordance with JIS K 7116, Young's modulus of the polyacetal resin having the aliphatic amide content of 15 ppm (ratio by weight) was 3000 Mpa, and Young's modulus of the polyacetal resin having the aliphatic amide content of 29 ppm (ratio by weight) was 2700 Mpa. Both of the Young's moduli had no practical problem, and creep test pieces after the bending or flexural creep test had no deformation. On the other hand, in a case that the bending or flexural creep test was performed with respect to polypropylene, polybutylene terephthalate/ABS resin, and polyethylene in a similar manner to the polyacetal resin, the test pieces were deformed. From the result described above, it is assumed that the polyacetal resins having the aliphatic amide contents of less than 29 ppm (ratio by weight) have satisfactory mechanical strength as the resin component.

As described above, in the ink-jet recording apparatus of the present teaching, even when the water-based ink containing the glycol ether and having the high permeability is used, precipitation or deposition of the aliphatic amide in the water-based ink is suppressed and the decrease of the mechanical strength of the resin component is also suppressed. The way of use of the ink-jet recording apparatus of the present teaching is not specifically limited, and the ink-jet recording apparatus is widely applicable to various types of ink-jet recording.

What is claimed is:

1. An ink-jet recording apparatus, comprising:
   a water-based ink which contains glycol ether and water;
   an element which is configured to contact with the water-based ink, is formed of a polyacetal resin, and contains aliphatic amide in an amount of less than 29 ppm by weight;
   an ink discharging mechanism which has an ink discharging surface from which the water-based ink is discharged; and
   a purge unit configured to suck the water-based ink in the ink discharging mechanism, wherein the purge unit contains the element.

2. The ink-jet recording apparatus according to claim 1, wherein the glycol ether is at least one glycol ether selected from the group consisting of tetraethylene glycol n-butyl ether, triethylene glycol n-butyl ether, and dipropylene glycol n-propyl ether.

3. The ink-jet recording apparatus according to claim 1, wherein the aliphatic amide is contained in the element in an amount of not less than 8 ppm by weight.

4. The ink-jet recording apparatus according to claim 1, wherein the glycol ether is contained in the water-based ink in an amount of 0.5% by weight to 10% by weight.

5. The ink-jet recording apparatus according to claim 1, wherein at least one glycol ether selected from the group consisting of tetraethylene glycol n-butyl ether, triethylene glycol n-butyl ether, and dipropylene glycol n-propyl ether is contained in the water-based ink in an amount of 1.5 by weight to 4.0% by weight; and
   the aliphatic amide is contained in the element in an amount ranging from 8 ppm by weight to less than 29 ppm by weight.

6. The ink-jet recording apparatus according to claim 1, wherein the purge unit includes a purge cap configured to cover the ink discharging surface of the ink discharging mechanism in a case that the water-based ink in the ink discharging mechanism is sucked and a pump configured to suck the water-based ink in the ink discharging mechanism; and
   at least one of the purge cap and the pump is the element.

7. An ink-jet recording apparatus, comprising:
   a water-based ink which contains glycol ether and water; and
   an element which is configured to contact with the water-based ink, is formed of a polyacetal resin, and contains aliphatic amide in an amount of less than 29 ppm by weight,
   wherein the water-based ink is a colorless ink which does not contain a colorant.

8. The ink-jet recording apparatus according to claim 7, wherein the glycol ether is at least one glycol ether selected from the group consisting of tetraethylene glycol n-butyl ether, triethylene glycol n-butyl ether, and dipropylene glycol n-propyl ether.

9. The ink-jet recording apparatus according to claim 7, wherein the aliphatic amide is contained in the element in an amount of not less than 8 ppm by weight.

10. The ink-jet recording apparatus according to claim 7, wherein the glycol ether is contained in the water-based ink in an amount of 0.5% by weight to 10% by weight.

11. The ink-jet recording apparatus according to claim 7, wherein at least one glycol ether selected from the group consisting of tetraethylene glycol n-butyl ether, triethylene glycol n-butyl ether, and dipropylene glycol n-propyl ether is contained in the water-based ink in an amount of 1.5 by weight to 4.0% by weight; and the aliphatic amide is contained in the element in an amount ranging from 8 ppm by weight to less than 29 ppm by weight.

12. The ink-jet recording apparatus according to claim 7, further comprising an ink accommodating section configured to accommodate the water-based ink, wherein the ink accommodating section contains the element.

13. The ink-jet recording apparatus according to claim 7, further comprising an ink discharging mechanism which has an ink discharging surface from which the water-based ink is discharged, wherein the ink discharging mechanism contains the element.

14. An ink cartridge comprising:
a water-based ink which contains glycol ether and water;
an ink container configured to accommodate the water-based ink therein; and
a frame constructing a casing of the ink container,
wherein the frame is an element which is configured to contact with the water-based ink, is formed of a polyacetal resin, and contains aliphatic amide in an amount of less than 29 ppm by weight.

15. The ink cartridge according to claim 14, wherein the glycol ether is at least one glycol ether selected from the group consisting of tetraethylene glycol n-butyl ether, triethylene glycol n-butyl ether, and dipropylene glycol n-propyl ether.

16. The ink cartridge according to claim 14, wherein the aliphatic amide is contained in the element in an amount of not less than 8 ppm by weight.

17. The ink cartridge according to claim 14, wherein the glycol ether is contained in the water-based ink in an amount of 0.5% by weight to 10% by weight.

18. The ink cartridge according to claim 14, wherein at least one glycol ether selected from the group consisting of tetraethylene glycol n-butyl ether, triethylene glycol n-butyl ether, and dipropylene glycol n-propyl ether is contained in the water-based ink in an amount of 1.5 by weight to 4.0% by weight; and
the aliphatic amide is contained in the element in an amount ranging from 8 ppm by weight to less than 29 ppm by weight.

19. The ink cartridge according to claim 14, wherein the water-based ink is a color ink containing a colorant.

* * * * *